Dec. 15, 1931. W. ERNST Re. 18,287

CONTROL MECHANISM FOR HYDRAULIC PRESSES

Original Filed Dec. 8, 1926 3 Sheets-Sheet 1

Inventor,
Walter Ernst,
By Baldwin & Wight
Attorneys.

Dec. 15, 1931. W. ERNST Re. 18,287

CONTROL MECHANISM FOR HYDRAULIC PRESSES

Original Filed Dec. 8, 1926 3 Sheets-Sheet 2

Inventor,
Walter Ernst,
By Bradford & Wright
Attorneys.

Dec. 15, 1931. W. ERNST Re. 18,287

CONTROL MECHANISM FOR HYDRAULIC PRESSES

Original Filed Dec. 8, 1926 3 Sheets-Sheet 3

Inventor

Walter Ernst,

By Baldwin & Wight

Attorneys.

Reissued Dec. 15, 1931 Re. 18,287

UNITED STATES PATENT OFFICE

WALTER ERNST, OF MOUNT GILEAD, OHIO, ASSIGNOR TO THE HYDRAULIC PRESS MANUFACTURING COMPANY, OF MOUNT GILEAD, OHIO

CONTROL MECHANISM FOR HYDRAULIC PRESSES

Original No. 1,711,378, dated April 30, 1929, Serial No. 153,410, filed December 8, 1926. Application for reissue filed March 14, 1931. Serial No. 522,710.

The invention herein disclosed is particularly adapted for use with a hydraulic press of the character disclosed in my Patent No. 1,672,561, issued June 5, 1928, but is adapted for use with other types of presses.

It is common to employ in hydraulic press mechanism a pump for forcing fluid under pressure to said press, which pump is of the type known as a variable stroke, variable and reversible discharge. A pump of this character may be seen for example in Patent 1,250,170 to Hele-Shaw et al., and is well known to those familiar with this art. In such pumps the direction of movement of the liquid discharged may be reversed and the speed may be varied simply by reciprocating a cross head or control member from one position to another. This cross head is connected to a floating ring which may be shifted off center with relation to other elements of the pump or may be held in a central position. When in a central position the pump runs idly while when the floating ring is off center on one side the fluid under pressure will be discharged in one direction but in the opposite direction when the floating ring is moved off center on the other side.

It is unnecessary to set forth the specific construction of the pump in any more detail and the same is not illustrated herein since the present invention relates to control mechanism interposed between the pump and the press whereby the operation of the pump will be controlled as desired.

Assuming that the press is idle and that the pump is running idly a movement of the lever adjacent the press through the interposed control mechanism will cause the pump to deliver fluid under pressure and produce the pressing stroke of the platen of the press. When a certain resistance has been built up in the system the control mechanism will operate automatically to throw the pump into reverse and produce the return movement of the press platen. When this return movement is completed the control mechanism will be again operated to terminate the return stroke of the platen, the latter remaining in its idle position until another pressing operation is initiated manually.

Figures 1, 2:
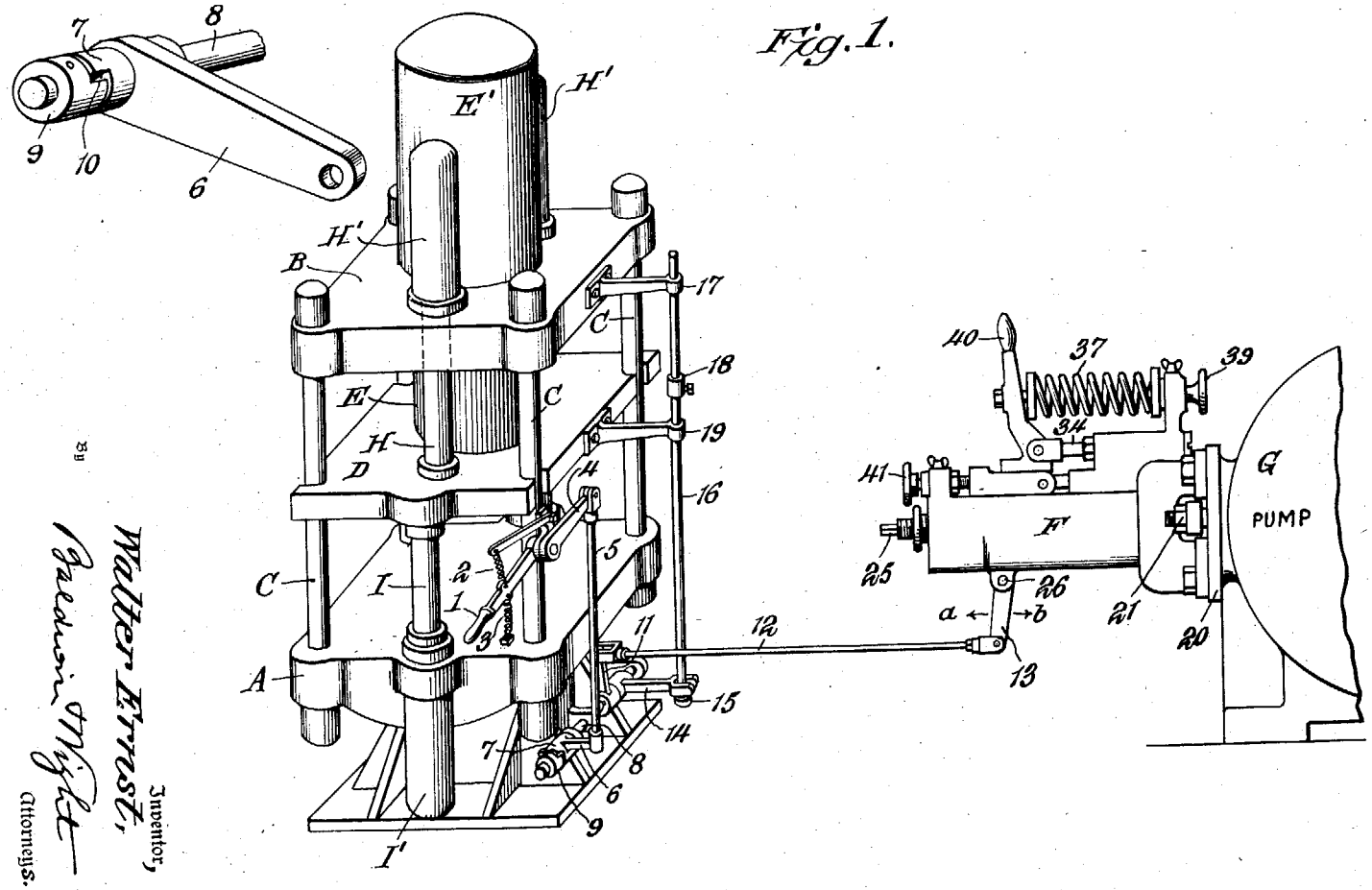
Figure 1 is a view showing a pump in elevation; and a press, and control linkage in perspective.
Figure 2 is a view of a detail.

The press is herein illustrated as comprising a bed A and a top B connected by four strain rods C and having the usual table and cooperating sliding platen D operated by a main ram E which is mounted for reciprocation in a main cylinder E′ formed with the usual ram-advancing chamber. The press is also provided with booster rams H connected to the platen and arranged to operate in booster cylinders H′, and with push-back rams I connected to the platen and arranged to operate in push-back cylinders I′, the push-back cylinders being provided with the usual ram-returning chambers. It is to be understood that this showing is merely illustrative and that various types of presses may be equipped with the control mechanism constituting the present invention.

For the purposes of illustration one form of control mechanism embodying the invention will be described as being used for controlling the operation of a press of the kind disclosed by my Patent No. 1,672,561, referred to above.

A pipe line *a* is shown as leading from the pump and has a branch *b* which communicates with the booster cylinders H′ which are intended to initiate the movement of the press ram. This line also has a connection *c* leading to a valve mechanism generally indicated at *d*. From this valve mechanism a pipe *e* communicates with the main cylinder E′ above the press ram. From the upper part of this cylinder a pipe *f* communicates by the way of a valve mechanism indicated generally at *g* with a surge tank *h*, which has a pipe *i* communicating with the valve mechanism *d*.

A second pipe *j* leads from the pump G and has a separate branch *k* communicating with the two push-back cylinders I′ which return the platen to its upper position. This line $j$ also has a line $l$ which communicates with a small chamber underlying the stem of the valve mounted in the valve mechanism $g$ above mentioned. The pipe $j$ also communicates with the valve mechanism $d$.

The valve mechanism $d$ comprises a main casting $m$ which is divided into four chambers $n$, $o$, $p$ and $q$. A partition $r$ between the chambers $n$ and $o$ is provided with a plurality of passages $s$ and a partition $t$ between the chambers $o$ and $p$ is provided with similar passages $u$. A valve stem $v$ is slidably mounted in the partitions $r$ and $t$ and carries at one end a head $w$ lying in the chamber $p$ and is adapted to close the openings $u$ and at its other end a head $x$ lying in the chamber $n$ is adapted to close the openings $s$. The valve stem is of such length that when one set of openings is closed the other is opened.

Also slidably mounted in the casing is a valve $y$ which coacts with a valve seat $z$ to control communication between the chambers $n$ and $q$. The upper end of this valve stem is guided in a bushing $a'$ set in the casing $m$ and acting to retain a packing $b'$. The lower end of the valve stem as a packing $c'$ held in place by a cylindrical member $d'$ which is screwed into the casing $m$. This member $d'$ has mounted therein a coil spring $e'$, which bears at one end against the valve stem and at its other end against a plate $f'$, the position of which may be adjusted by a screw $g'$ adjustably mounted in a cap $h'$ which is screw threaded on the open end of the member $d'$. In this manner the tension of the spring may be varied and the valve set to open at differing pressures.

The valve mechanism $g$ comprises a casing $i'$ having therein a passage $j'$ which is controlled by a valve $k'$. The stem $l'$ of this valve is separate and fits slidably in a short tubular member which is connected to the end of the pipe $l$. Suitable packing $m'$ is provided and a small chamber $n'$ is formed in the tubular member just mentioned. A coil spring $o'$ surrounds the valve stem $l'$ and bears at its lower end against a collar $p'$ carried by said valve stem and at its upper end against a fixed collar $q'$ through which the valve stem $l'$ slides so that this spring tends to hold the stem $l'$ in its lower position.

Figure 4:
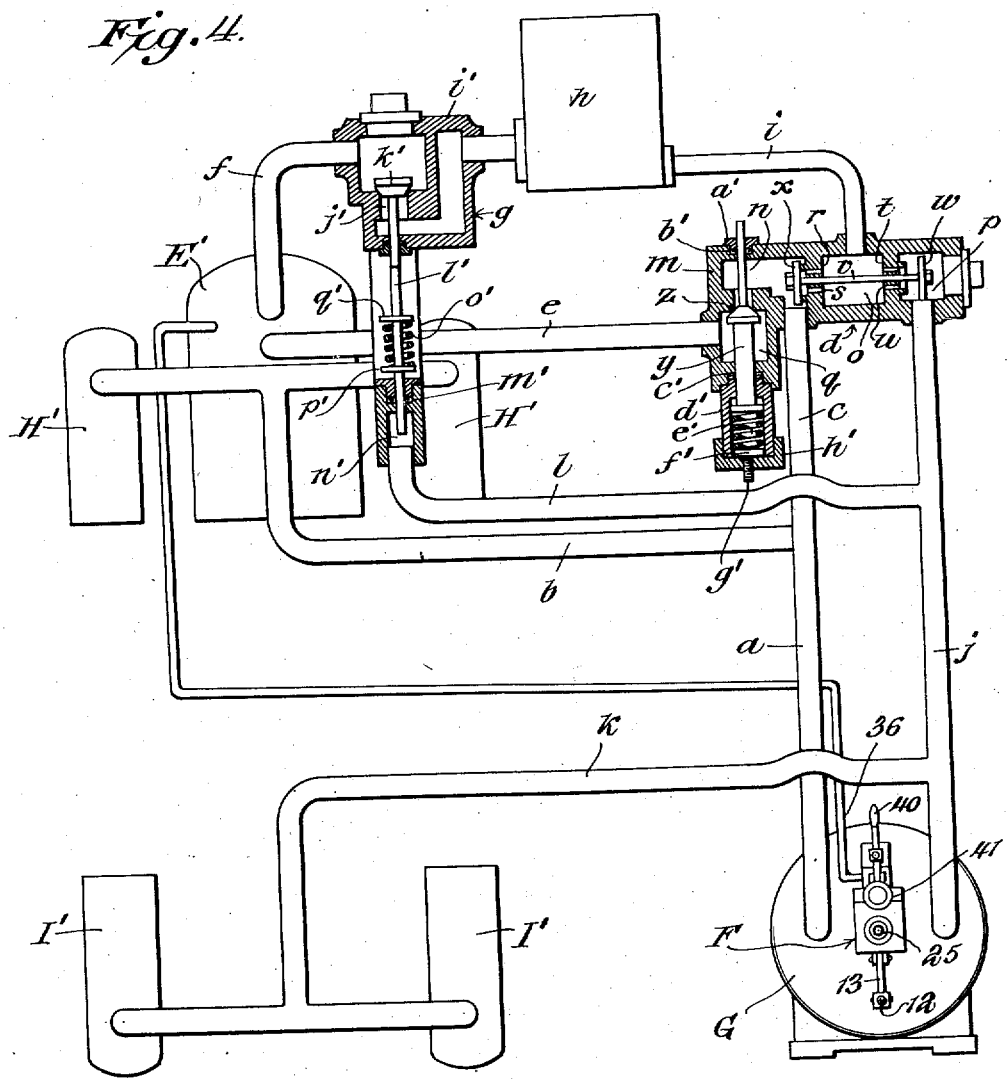
Figure 4 is a diagrammatic view of the hydraulic circuit.

The operation of the circuit may be described as follows. It is assumed that it is desired to operate the press. The pump is set to deliver fluid under pressure through the line $a$. The branch $c$ of this line which communicates with the chamber $n$ will thus receive fluid under pressure and the valve stem $v$ will slide to the right in Figure 4 so that the valve head $x$ closes communication between the chambers $n$ and $o$ as shown in this figure. At the same time, fluid under pressure will pass through the branch pipe line $b$ to the booster cylinders H′ and thus start the movement of the press ram downwardly. This, of course, tends to produce a vacuum in the upper portion of the main cylinder E′, but the suction exerted through the pipe $f$ will lift the valve $k'$ off its seat against the force of gravity and permit liquid to flow from the surge tank $h$ through the valve casing $i'$ and pipe $f$ into the upper portion of the main cylinder E′ behind the press ram. This action will continue until the ram meets sufficient resistance to build up the pressure in the pipe line $a$ to a point where it is sufficient to overcome the force of the spring $e'$. The valve $y$ will then be moved downwardly away from the valve seat $z$, opening communication between the chambers $n$ and $q$ and the fluid will pass from the pipe $c$ through the chamber $n$, chamber $q$, and pipe $e$ into the main cylinder E′. As soon as the fluid under high pressure enters the main cylinder E′, the back pressure exerted through the pipe $f$ will close the valve $k'$ and prevent this fluid from returning to the surge tank at this time. The parts will remain in this position until the pressing operation is completed.

Thereafter, the pump will be reversed in a manner to be later described and will discharge fluid under pressure into the pipe line $j$. The branch $k$ of this line will conduct fluid to the push back cylinders I′ and immediately begin returning the ram to its normal upper position. At the same time the fluid entering the chamber $p$ will move the valve stem $v$ to the left so that the head $w$ will close communication between the chambers $p$ and $o$. At this time the fluid under pressure will also pass through the branch $l$ to the under side of the valve stem $l'$ and exert sufficient pressure thereon to lift the valve $k'$ off of its seat and permit the fluid behind the press ram, which is now moving upwardly, to be forced through the pipe $f$ and valve casing $i'$ into the surge tank $h$. As soon as the press ram reaches its upper normal position, its movement will be arrested as will be later described.

It will be understood that the particular arrangement of press and operating valves described above is fully shown, described and claimed in my Patent No. 1,672,561, and does not, per se, constitute the subject matter of the present invention, which is directed to novel control mechanism and the operative connection of such mechanism to various presses and hydraulic circuits.

This control mechanism comprises certain elements preferably carried by the press frame which may be referred to broadly as the controlling linkage and control mechanism which may be carried by or attached to the pump proper and constitutes the control mechanism proper.

The control linkage comprises a handle 1 carried by the press frame and normally held in intermediate position by springs 2 and 3. To the handle is connected an arm 4 pivoted to a link 5, which at its other end is pivoted to an arm 6 having a hub 7 which is loosely mounted on a shaft 8 carried by the press frame. A collar 9 is fast on said shaft and the hubs 7 and 9 have interlocking projections cut away as indicated at 10 to provide for a certain amount of lost motion in either direction of one part relative to the other. An arm 11 is fixed to the shaft 8 and is connected by a link 12 which is preferably adjustable to an arm 13 of the control mechanism proper. The shaft 8 also has an arm 14 provided with a forked end which overlies a head 15 on a rod 16 mounted to slide in a bracket 17 carried by the press and provided with an adjustable stop collar 18 adapted to be engaged by an arm 19 which terminates in an eye sliding on the rod 16 which arm is carried by the platen D and will engage the stop collar 18 at a point predetermined by the adjustment of said stop collar.

If the parts are in the position shown in Figure 1 and the lever 1 is depressed the link 5 will be raised and the arm 6 moved upwardly, which after the lost motion is taken up, will produce a movement of the rod 8 and through the arm 11 and link 12 will move the control lever 13 in the direction of the arrow *a* and cause the pump to deliver fluid in a proper direction to initiate the pressing operation. At the termination of the downward movement of the press, the control mechanism indicated generally at F and carried by the pump G will operate to move the rod 12 as hereinafter described quickly toward the right. This will not be dangerous to the operator because this movement will merely take up the lost motion and cause no movement whatever of the lever 1 at this time, since this lever has already been released by the operator and has been returned to its central position.

When the control mechanism as just described has been reversed, the pump then delivers fluid under pressure in a direction to return the platen D to its upper position. In this upward movement the arm 19 will ultimately contact with the collar 18 which will lift the rod 16 and through the one way connection 14 and 15 will move the rod toward the left in Figure 1 sufficiently to bring the control arm 13 to central position in which the pump remains idle.

The control mechanism F through which the above sequence of operations is produced will now be described. The pump is provided with the usual control member or movable cross head 20 and attached thereto is a stem 21. This stem is mounted to slide in a sleeve 22, which is hollow throughout a portion of its length, and the head 23 of the stem bears against a spring 24 enclosed in the hollowed portion of the sleeve 22. A stem 25 is screw threaded into the sleeve 22 and holds the spring 24 normally under about fifty pounds pressure.

Figure 3:
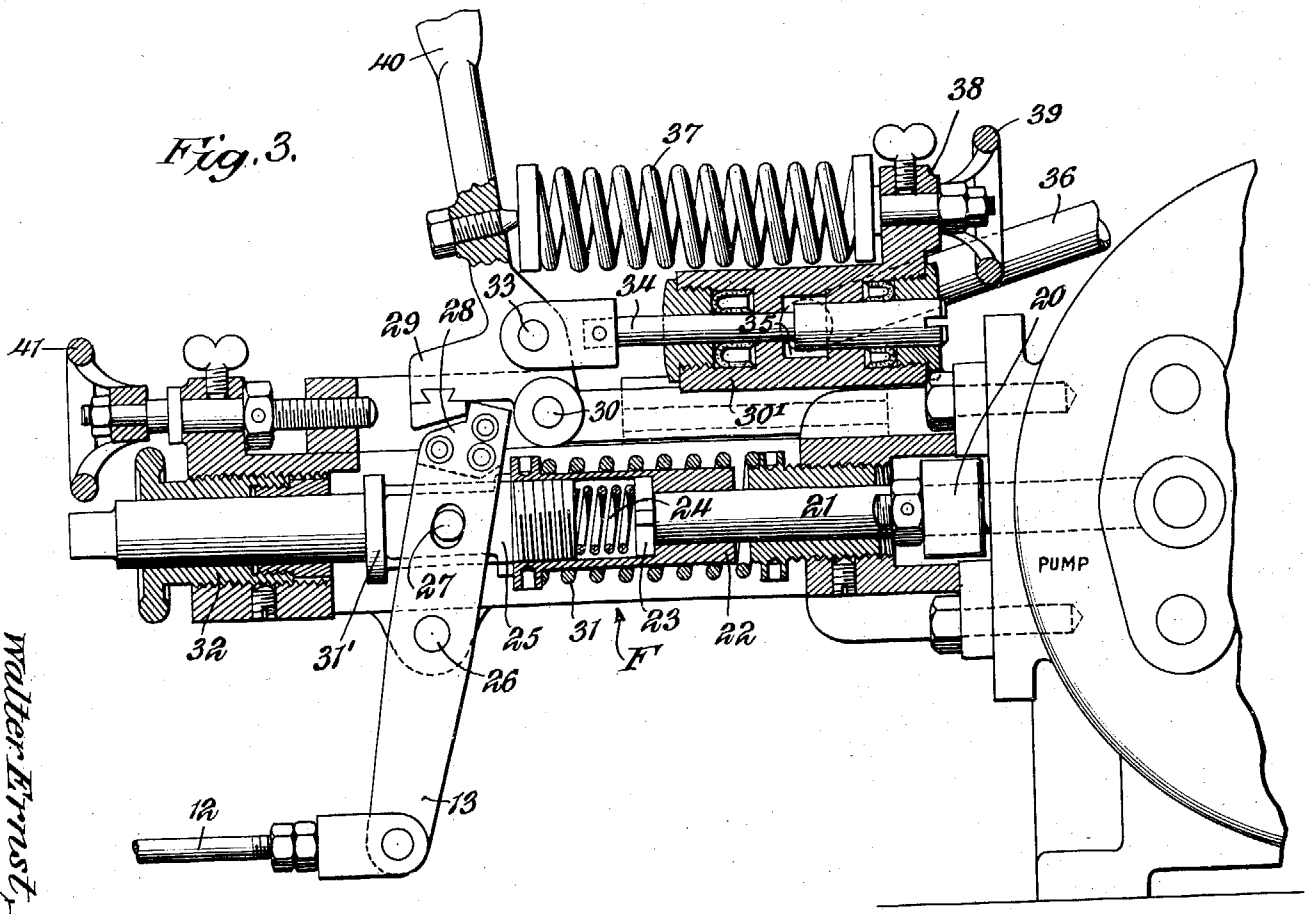
Figure 3 is a longitudinal section through a part of the control mechanism.

The control lever 13 is fulcrumed at 26 to the casing of the control mechanism and is connected as at 27 to the stem 25. The free end of the lever 13 is provided with a hardened portion 28 which is adapted to engage with a detent or trip member 29 which is fulcrumed at 30. A strong spring 31 is coiled about the sleeve 22 and bears at one end against a fixed part and at the other against a flange on said sleeve and obviously tends to move the sleeve and the stem 25 toward the left as shown in Figure 3. This movement when permitted is limited by the engagement of a collar 31′ on the stem with an adjustable stop member 32.

The fulcrum 30 of the trip 29 is connected to a small cylinder 30′ which travels horizontally on slides on top of a control member F. This cylinder may be moved and locked in desired position by means of a hand wheel 41. Trip 29 has pivoted thereto at 33 a piston 34 which slides in the cylinder 30′ and has a head working in a chamber 35 of said cylinder. From this chamber a pipe 36 communicates with the main cylinder of the press so that the pressure in the chamber 35 will always be the same as that in the main press cylinder. A spring 37 bears at one end against the trip 29 and tends to hold it in engagement with the free end 28 of the control lever 13 as shown in Figure 3. The tension of this spring 37 may be adjusted by means of a hand wheel 39 carried by a flange 38 of the cylinder 30′.

Assuming that the press is in its upper position, the operator initiates the operation by moving the hand lever 1 as above described which moves the link 12 toward the left and rocks the control lever 13 about its pivot point 26 thereby moving the free end thereof toward the right. This movement will cause the upper end thereof to cam the trip 29 out of its path after which said trip snaps into the Figure 3 position and holds the control lever 13 in that position. This movement of the control lever toward the right also moves the cross head 20 and so controls the pump that fluid will be delivered under pressure to the main press cylinder. The spring 24 permits a little overtravel of the stem 25 after the stem 21 has completed its stroke in order that the free end 28 may move far enough to insure its being retained by the trip 29. The amount of movement of the lever 13 and the stem 25 will be governed by the position of the trip member 29. If the fulcrum 30 is moved by means of the hand wheel 41 toward the left the trip 29 will engage the control lever 13 at an earlier point of its movement so that the stem 25 will be moved only through a part of its full stroke which will result in the pump delivering only a partial amount of the fluid and therefore imparting slower speed to the press. This hand wheel 41 may be set for any speed desired.

Since fluid is now being delivered under the desired pressure to the main cylinder of the press, the press platen will now move until it hits a certain resistance. The pressure in the system and consequently in the chamber 35 will now build up and will ultimately overcome the tension of the spring 37 and move the piston 34 to the right, thus releasing the trip 29 from engagement with the control lever 13. The tension of this spring 37 may be varied by means of the hand wheel 39, thus varying the pressure at which the control mechanism will be operated and consequently varying the maximum pressure to be exerted by the press.

As soon as the trip 29 releases the operating lever 13 the spring 31 will cause the stem 25 to move toward the left a sufficient distance to reverse the pump and cause fluid to be discharged under pressure to the press for returning the platen to its normal position. The amount of this movement and consequently the return speed of the press may be regulated by adjusting the stop member 32.

The press will now return at this predetermined rate of speed until the arm 19 contacts with the stop 18 as above described which will impart a movement to the control arm 13 returning the stem 21 to the right and moving the pump into neutral position. The parts will remain in such position until a second sequence of operations is initiated by a movement of the lever 1. The press will stay in upper position indefinitely so long as the pump is running even if there is a leak in the system, since as soon as it starts to move downward it will release the stop collar 18 thus releasing the controlling lever 13 and permitting the spring 31 to move the stem 21 slightly, thus moving the pump to a position to exert a certain pressure in a direction to return the platen to its upper position.

It will be observed that the lever 13 constitutes a device movable to three positions, in the first of which the pump cross head is set in its neutral position, in the second of which the cross head is set for pump delivery in a direction to cause the platen to perform a pressing stroke, and in the third of which the cross head is set for pump discharge in a direction to cause the platen to perform a return stroke. The manually operable lever 1 and the associated linkage serves to move the lever 13 to its second position in which it will be retained by the trip 29; and the spring 31, whose action is controlled by the pressure responsive trip 29 and piston 34, serves to move the lever from its second position to its third position.

It may be noted that if the fulcrum point 30 is moved to the extreme right, the automatic feature may be eliminated since in this case the trip 29 will never engage with the lever 13 and the press will operate like an ordinary manually operated double acting cylinder. It is also noted that the trip 29 may be provided with a hand lever 40 through which it may be operated independently of the automatic mechanism if desired. It is also possible to operate the lever 1 by means of a pedal instead of by hand.

Various other detail changes may be made in the precise construction without in any way departing from the spirit of the invention, which is to be regarded as limited only by the scope of the appended claims.

I claim as my invention:

1. A control mechanism adapted to be operatively connected to a hydraulic circuit including a reversible variable discharge pump and a hydraulic press having a movable platen; said mechanism comprising a device adapted to occupy three positions, means for moving the device from the first to the second position to cause the pump to discharge so as to produce the pressing movement of the platen, pressure controlled means for thereafter moving the device from the second to the third position to reverse the discharge of the pump and produce the return movement of the platen, and automatic means for thereafter moving the device from the third to the first position to place the pump in a neutral position.

2. A control mechanism adapted to be operatively connected to a hydraulic circuit including a reversible variable discharge pump and a hydraulic press having a movable platen; said mechanism comprising a device adapted to occupy three positions, means for moving the device from the first to the second position to bring about the pressing movement of the platen, means for detaining the device in such position, means controlled by the pressure in the circuit for releasing said detaining means, and means for moving said device when released from the detaining means from the second to the third position to produce the return movement of the platen.

3. A control mechanism adapted to be operatively connected to a hydraulic circuit including a reversible variable discharge pump and a hydraulic press having a movable platen; said mechanism comprising a device adapted to occupy three positions, means for moving the device from the first to the second position to bring about the pressing movement of the platen, a spring actuated detent for detaining the device in such position; means controlled by the pressure in the circuit for releasing said detent, and spring means for moving said device when released from the detaining means from the second to the third position to produce the return movement of the platen.

4. A control mechanism adapted to be operatively connected to a hydraulic circuit including a reversible variable discharge pump and a hydraulic press having a movable platen; said mechanism comprising a device adapted to occupy three positions, means for moving the device from the first to the second position to bring about the pressing movement of the platen, a spring actuated detent for detaining the device in such position, means for varying the normal position of the detent to thereby vary the position of the device and the consequent speed of the press, and means controlled by the pressure in the circuit for releasing said detent to permit the device to move to another position.

5. A control mechanism adapted to be operatively connected to a hydraulic circuit including a reversible variable discharge pump and a hydraulic press having a movable platen; said mechanism comprising a device adapted to occupy three positions, means for moving the device from the first to the second position to bring about the pressing movement of the platen, means for detaining the device in such position, means controlled by the pressure in the circuit for releasing the device from the detaining means, means for moving the device when released from the second to the third position, and means for varying the third position of the device and the consequent speed of the return movement of the platen.

6. A control mechanism adapted to be operatively connected to a hydraulic circuit including a reversible variable discharge pump and a hydraulic press having a movable platen; said mechanism comprising a device adapted to occupy three positions, means for moving the device from the first to the second position to bring about the pressing movement of the platen, means for detaining the device in such position, means for varying the normal position of the detaining means to thereby vary the position of said device and the consequent speed of the platen, means controlled by the pressure in the circuit for releasing the device from the detaining means, means for moving the device when released from the second to the third position, and means for varying the third position of the device and the consequent speed of the return movement of the platen.

7. A control mechanism adapted to be operatively connected to a hydraulic circuit including a reversible variable discharge pump and a hydraulic press having a movable platen; said mechanism comprising a device movable to three positions, manually operable means adjacent said press for moving the device from the first to the second position to bring about the pressing movement of the platen, means controlled by the pressure in the circuit for moving the device from the second to the third position to produce the return movement of the platen, and means controlled by the return movement of the platen for moving the device from the third to the first position to place the pump in a neutral position.

8. A control mechanism adapted to be operatively connected to a hydraulic circuit including a reversible variable discharge pump and a hydraulic press having a movable platen; said mechanism comprising a device movable to three positions, manually operable means adjacent said press for moving the device from the first to the second position to bring about the pressing movement of the platen, means controlled by the pressure in the circuit for moving the device from the second to the third position to produce the return movement of the platen, means controlled by the return movement of the platen for moving the device from the third to the first position to place the pump in a neutral position, and means for varying the second and third positions of said device.

9. A control mechanism adapted to be operatively connected to a hydraulic circuit including a reversible variable discharge pump having a control member and a hydraulic press having a movable platen; said mechanism comprising a movable device connected to said control member, means for moving said device to a position to produce the pressing movement of the platen, a spring operated detent for said device, a piston connected to the detent and operated by the pressure in the circuit for releasing said detent, and means for thereafter moving said device to a position to produce the return movement of the platen.

10. A control mechanism adapted to be operatively connected to a hydraulic circuit including a reversible variable discharge pump having a control member and a hydraulic press having a movable platen; said mechanism comprising a movable device connected to said control member, means for moving said device to a position to produce the pressing movement of the platen, a spring operated detent for said device, a piston connected to the detent and operated by the pressure in the circuit for releasing said detent, and means for varying the predetermined pressure at which the detent will be released.

11. A control mechanism adapted to be operatively connected to a hydraulic circuit including a reversible variable discharge pump having a control member and a hydraulic press having a movable platen; said mechanism comprising a movable device connected to said control member, means for moving said device to a position to produce the pressing movement of the platen, a spring operated detent for said device, a piston connected to the detent and operated by the pressure in the circuit for releasing said detent, means for varying the predetermined pressure at which the detent will be released, and means for thereafter moving said device to a position to produce the return movement of the platen.

12. A control mechanism adapted to be operatively connected to a hydraulic circuit including a reversible variable discharge pump and a hydraulic press having a movable platen; said mechanism comprising a lever adapted to be connected to and control said pump, a link extending from the lever to a point adjacent the press, a rock shaft connected to said link, and manually operable lever-actuating means having a lost motion connection with said rock shaft.

13. A control mechanism adapted to be operatively connected to a hydraulic circuit including a reversible variable discharge pump and a hydraulic press having a movable platen; said mechanism comprising a lever adapted to be connected to and control said pump, a link extending from the lever to a point adjacent the press, a rock shaft connected to said link, manually operable lever actuating means having a lost motion connection with said rock shaft, and means adapted to be operated by the movement of the platen having a one way connection with the rock shaft for moving the lever to neutral position.

14. In combination, a reversible, variable capacity pump, a double acting hydraulic motor, means forming with the pump and motor a hydraulic circuit, mechanism for varying the pump capacity from zero in either direction of flow, means for moving said mechanism from zero capacity position to pumping position whereby the motor piston is made to advance, means responsive to the attainment of a predetermined pressure on the motor piston for reversing said mechanism whereby the piston is made to perform a return stroke, and means responsive to the attainment by the piston of a predetermined position in the return stroke for moving said mechanism to zero capacity position.

15. The combination with a hydraulic press including a stationary table and a reciprocatory platen movable towards and from the table, of a reversible pump, means forming with the press and pump a hydraulic circuit, and controlling means operatively connected with the pump and circuit for effecting movement of the platen towards the table and responsive to the pressure built up in the circuit during said movement of the platen for automatically reversing the pump and platen irrespective of the position of the platen relative to the table.

16. The combination with a hydraulic press including a stationary table and a reciprocatory platen moving towards and from the table, of a reversible pump, means forming with the press and pump a hydraulic circuit, and controlling means operatively connected with the pump and circuit for effecting movement of the platen towards and from the table and including a control lever operatively connected with the pump for controlling the direction of fluid flow in the circuit, a trip for holding said lever in one extreme position for directing the fluid to move the platen towards the table, means responsive to the built up pressure in the circuit during said movement of the platen to release said trip, and means for moving the control lever to the other extreme position upon release of said trip whereby the direction of fluid flow in the circuit will be reversed.

17. The combination with a hydraulic press including a stationary table and a reciprocatory platen movable towards and from the table, of a reversible pump, means forming with the press and pump a hydraulic circuit, and controlling means operatively connected with the pump and circuit for effecting movement of the platen towards and from the table and including a control lever operatively connected with the pump for controlling the direction of fluid flow in the circuit, a trip for holding said control lever in one extreme position for directing the fluid to move the platen towards the table, means responsive to the built up pressure in the circuit during said movement of the platen to release said trip, said responsive means including a pressure chamber operatively connected to the circuit, and a piston in said chamber and connected to the trip, and means for moving the control lever to the other extreme position upon release of said trip whereby the direction of fluid flow in the circuit will be reversed.

18. The combination with a hydraulic press including a stationary table and a reciprocatory platen movable towards and from the table, of a reversible pump, means forming with the press and pump a hydraulic circuit, controlling means operatively connected with the pump and circuit for effecting movement of the platen towards and from the table and including a control lever operatively connected with the pump for controlling the direction of fluid flow in the circuit, a trip for holding said lever in one extreme position for directing the fluid to move the platen towards the table, means responsive to the built up pressure in the circuit during said movement of the platen to release said trip, said responsive means including a pressure chamber operatively connected to the circuit, and a piston in said chamber and connected to the trip, means for moving the lever to the other extreme position upon release of said trip whereby the direction of fluid flow in the circuit will be reversed, and means controlled by the platen for moving the control lever to an intermediate position for placing the pump in neutral position.

19. The combination with a hydraulic press including a stationary table and a reciprocatory platen movable towards and from the table, of a reversible pump, means forming with the press and pump a hydraulic circuit, controlling means operatively connected with the pump and circuit for effecting movement of the platen towards the table and responsive to the pressure built up in the circuit during said movement of the platen for automatically reversing the pump and the platen irrespective of the position of the platen relative to the table, and means connected to the controlling means and operated by the platen during the reverse movement thereof to automatically place the pump in neutral position and thereby stop the movement of the platen at the end of one complete cycle.

20. The combination with a hydraulic press including a stationary table and a reciprocatory platen movable towards and from the table, of a reversible pump, means forming with the press and pump a hydraulic circuit, and controlling means operatively connected with the pump and circuit for effecting movement of the platen towards and from the table and including a control lever operatively connected with the pump for controlling the direction of fluid flow in the circuit, a trip for holding said lever in one extreme position for directing the fluid to move the platen towards the table, means responsive to the built up pressure in the circuit during said movement of the platen to release said trip, and means for moving the control lever to the other extreme position upon release of said trip whereby the direction of fluid flow in the circuit will be reversed, and means connected to the control lever and operated by the platen during the reverse movement thereof to automatically move the lever to an intermediate position and thereby place the pump in neutral position and stop the movement of the platen at the end of one complete cycle.

21. The combination with a hydraulic press including a stationary table and a reciprocatory platen movable towards and from the table, of a reversible pump, means forming with the press and pump a hydraulic circuit, and controlling means operatively connected with the pump and circuit for effecting movement of the platen towards and from the table and including a control lever operatively connected with the pump for controlling the direction of fluid flow in the circuit, a trip for holding said lever in one extreme position for directing the fluid to move the platen towards the table, means responsive to the built up pressure in the circuit during said movement of the platen to release said trip, and means for moving the control lever to the other extreme position upon release of said trip whereby the direction of fluid flow in the circuit will be reversed, and means connected to the control lever and operated by the platen during the reverse movement thereof to automatically move the lever to an intermediate position and thereby place the pump in neutral position and stop the movement of the platen at the end of one complete cycle, and manually operable means connected to the control lever for moving the same for engagement by the trip.

22. The combination with a hydraulic press including a stationary table and a reciprocatory platen movable towards and from the table, of a reversible pump, means forming with the press and pump a hydraulic circuit, controlling means operatively connected with the pump and circuit for effecting movement of the platen towards the table and responsive to the pressure built up in the circuit during said movement of the platen for automatically reversing the pump and the platen irrespective of the position of the platen relative to the table, and means for automatically bringing the platen to rest at the end of a return stroke.

23. The combination with a hydraulic press including a stationary table and a reciprocatory platen movable towards and from the table, of a reversible pump, means forming with the press and pump a hydraulic circuit, controlling means operatively connected with the pump and circuit for effecting movement of the platen towards the table and responsive to the pressure built up in the circuit during said movement of the platen for automatically reversing the pump and the platen irrespective of the position of the platen relative to the table, and means operated by movement of the platen during a return stroke for automatically bringing the platen to rest at the end of such stroke.

24. The combination with a double acting hydraulic motor including a table, and a reciprocatory ram movable towards and from the table; of a reversible pump; means forming with the motor and pump a hydraulic circuit; and controlling means operatively connected with the pump and circuit for controlling the direction of flow of fluid in the circuit for effecting working and return strokes of said ram, said controlling means including a device movable to two positions to respectively effect working and return strokes, and a means for detaining said device in a position to effect a working stroke and being adapted to be actuated by pressure built up in said circuit for releasing said device to effect reversal of the pump and of the ram and performance of a return stroke.

25. The combination with a double acting hydraulic motor including a table, and a reciprocatory ram movable towards and from the table; of a reversible pump; means forming with the motor and pump a hydraulic circuit; controlling means operatively connected with the pump and circuit for controlling the direction of flow of fluid in the circuit for effecting working and return strokes of said ram, said controlling means including a device movable to two positions to respectively effect working and return strokes, and a means for detaining said device in a position to effect a working stroke and being adapted to be actuated by pressure built up in said circuit, for releasing said device to effect reversal of the pump and of the ram and performance of a return stroke; and means operable when the ram approaches the end of a return stroke for bringing the ram to rest.

26. The combination with a double acting hydraulic motor including reciprocatory ram means, and cylinder means having ram-advancing and ram-returning chambers in which said ram means is mounted for performing working and return strokes, of a reversible pump; means forming with the pump and said ram-advancing and ram-returning chambers a hydraulic circuit; and controlling means operatively connected with the pump and circuit for controlling the direction of discharge of said pump and the direction of movement of said ram means, said controlling means including mechanism movable to cause the pump to deliver fluid under pressure to said ram-advancing chamber to effect a working stroke of said ram means and being responsive to built up pressure in said ram-advancing chamber for automatically reversing the pump to deliver fluid under pressure to said ram-returning chamber to thereby effect a return stroke of the ram means.

In testimony whereof I have hereunto subscribed my name.

WALTER ERNST.